Sept. 1, 1964 A. A. SANFORD 3,146,495
SEAMLESS PLASTIC TUBING EXTRUSION MOLDING MACHINE
Filed March 7, 1962

INVENTOR.
Albert A. Sanford,
BY Richards & Cifelli,
Attorneys

United States Patent Office 3,146,495
Patented Sept. 1, 1964

3,146,495
SEAMLESS PLASTIC TUBING EXTRUSION
MOLDING MACHINE
Albert A. Sanford, 412 Willow Ave., Garwood, N.J.
Filed Mar. 7, 1962, Ser. No. 178,042
6 Claims. (Cl. 18—14)

This invention relates in general to plastic extrusion molding, and has particular reference to extrusion machines employed in the production of plastic tubing.

In extrusion machines of this type, it is standard practice to support the male die in coaxial relation to the female die by means of a spider having radial ribs around which the plastic material must flow from the extruder screw into the space of annular cross-section that intervenes between the dies. Because of interference by the radial ribs of the spider with rectilinear flow of the plastic material, objectionable weld line seams are created in the tubing product.

It, therefore, is the primary object of my invention to incorporate in the construction of an extrusion molding machine means to obviate the creation of weld line seams.

To be more explicit, the means for this purpose serves to split the widely diverging plastic currents caused by the radial spider members into plural fine jets which swirl spirally and coalesce with each other in a manner to result in homogeneous smoothly rectilinear flow with consequent production of seamless tubing.

The above stated and other objects will become apparent from a reading of the following description of an illustrative embodiment of this invention in connection with the accompanying drawings thereof, in which drawings.

Like characters of reference are applied in the above described views of the invention to indicate corresponding parts thereof.

Figure 1:
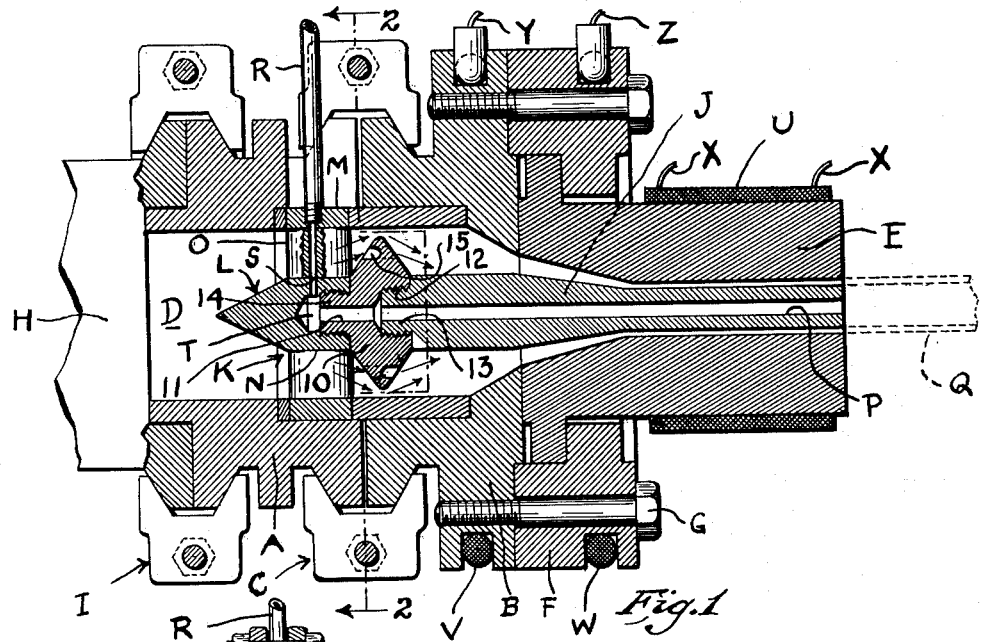
FIG. 1 is a vertical axial sectional view of a typical plastic tube extrusion machine, showing the jet forming baffle of my invention incorporated therein.
Figure 2:
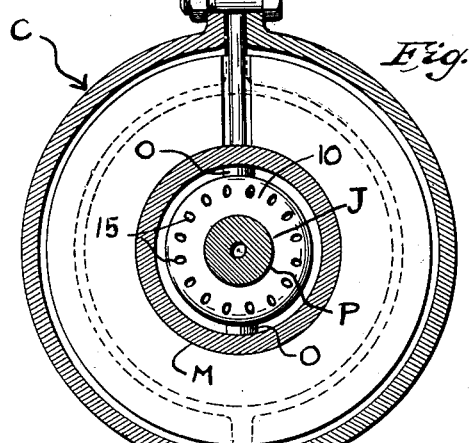
FIG. 2 is a vertical cross-section taken on line 2—2 in FIG. 1.
Figure 3:
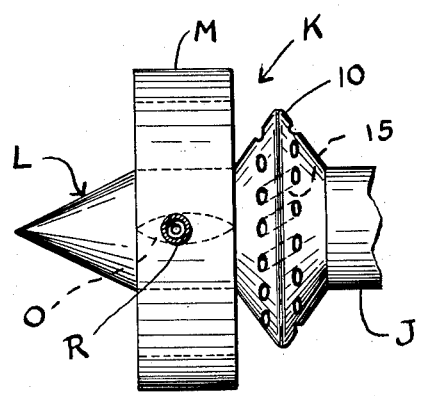
FIG. 3 is a large-scale fragmentary side elevation of the complete spider assembly, including the proposed baffle section.
Figure 4:
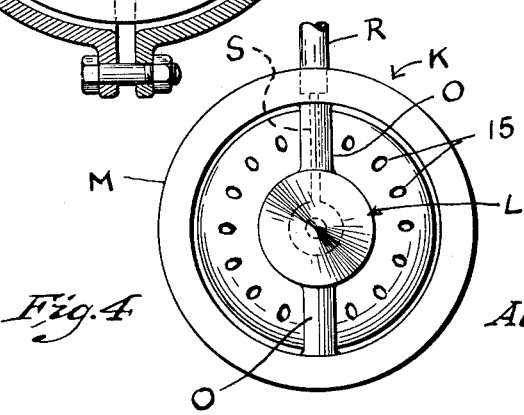
FIG. 4 is a front elevation of the same.

Referring now in detail to the drawings, FIGS. 1 and 2 show the assembled fundamental component elements of the cylinder of a typical tube-extruding plastic machine. The elements of conventional construction include a hollow cylindrical die assembly head A and a similarly hollow downstreamwardly located head cap B held demountably in axial alignment and in intercommunication with said die assembly head by suitable clamping means C to provide a through passage D for flow of liquid plastic material into and through a conventional female die E. This female die E is held demountably in axial alignment and intercommunication with head cap B by suitable clamping means, such as retainer ring F and clamping means G.

At the upstream entrance to flow passage D in die assembly head A, a screw-type extruder H is secured demountably by suitable clamping means I.

A male die, or mandrel, J is supported in cooperative coaxial relation to female die E by a spider assembly complete K, which includes a spider body section L that is almost entirely of conventional construction. Spider body section L comprises an outer ring M, which is countersunk in the peripheral walls of flow passage D in die assembly head A and head cap B, a concentric hub N, and plural radial ribs, or spokes, O of substantially streamline cross-section integral with said outer ring and hub.

Male die J has an axial through bore P to provide a passage for compressed air leading to the interior of the plastic tube Q being extruded (shown in broken lines in FIG. 1) to maintain the wall of the tube in the desired round shape until the extruded material of which it is composed has become cooled and hardened. The compressed air for this purpose is fed from a source of supply (not shown) through a pipe R and a conduit S extending through outer ring M, one rib O, and hub N of spider body section L into the central cavity T of said hub, from which it enters bore P of male die J through intervening passage means to be described in detail presently.

In accordance with the usual practice, heating means for the extruding dies are applied to the downstream end of the molding machine in appropriately distributed relation thereto, together with means for controlling the degree of heat selectively in conformity with the nature of the plastic material being used at any time. It is to be understood that heating means other than electrical may be employed within the spirit and scope of my invention, but I have shown, by way of example, electrical heating elements, which may take the form of a wide band U surrounding femal die E and rings V and W, respectively, surrounding head cap B and retainer ring F. The terminal X of band U and terminals Y and Z, respectively, of rings V and W are adapted to be connected to a source of electrical supply and current controlling means (not shown).

All of the molding machine construction which has just been described is old per se and no claim of invention is made therefor. The point of novelty resides in the baffle section 10 of the spider assembly complete K in combination with those old elements which are essential to useful functioning of said baffle section in its intended capacity, viz. to prevent the formation of objectionable weld seam lines on the extruded plastic tubing.

Baffle section 10 is a substantially disc-like member having a central axial orifice 11 adapted to be arranged in axial alignment and communication with the upstream end of bore P of male die J. The rigidity of this arrangement is achieved by providing the downstream end of orifice 11 with an enlarged portion 12 which is internally screwthreaded and by providing an externally screwthreaded reduced portion 13 on the upstream end of male die J for detachable engagement within said enlarged portion 12 of orifice 11 of baffle section 10. A screwthreaded nipple 14 is provided on the upstream end of baffle section 10 for detachable engagement with the downstream end of cavity T in spider body section L which is correspondingly screwthreaded.

The peripheral portion of baffle section 10 has a downstreamwardly sharply divergent-convergent contour and is nearly equal in outside diameter to the inside diameter of flow passage D. A circumferential row of jet orifices 15 perforate the peripheral edge portion of baffle section 10. These orifices 15 are preferably equidistant from each other and from the axis of baffle section 10. Moreover, all of orifices 15 are roughly encompassingly spirally arranged in relation to the axis of baffle section 10, although each of said orifices is straight and parallel to the adjacent orifices to facilitate production by drilling process.

In other words, the orifices 15 lie in end to end planes parallel to the axis of the flow passage D and the dies J and E, but extend diagonally relative to said axis, and thus obliquely across the normal axial flow direction of the material expressed through the spider assembly K to the dies J and E. The baffle arrangement is such that a major portion of the expressed material must pass through the orifices 15 while a minor portion passes externally between the baffle section 10 and the surrounding walls of the passage D, thereby effecting a swirling intermixing and commingling action upon said portions of the material flowing to and between the dies J and E, thus eliminating weld lines or seams in the finished product issuing from said dies.

The oblique angularity of jet orifices 15 with respect to the axis of baffle section 10 is permissibly within a range of 5° to 50°, but the range is restricted to from 25° to 35°, preferably.

*Operation*

After the massive main streams of plastic material have passed downstreamward around the ribs O of spider body section L, they will enter orifices 15 and be divided into a great many small jets which will swirl spirally as they emerge from the said orifices and become intermixed with each other and with any undivided portions of the main streams. The result will be that all streams and jets coalesce to produce a homogeneous mass at the entrance to the space between the respective male and female dies J and E. Consequently, no weld line seams will appear in the finished plastic tubing.

Having now described my invention, I claim:

1. In a plastic tube extrusion molding machine, the combination of a cylinder structure having an axial through passage for flow of plastic material in a heated state therethrough, a female die affixed to the downstream end of said cylinder structure in alignment and communication with said flow passage, an extruder connected with the upstream end of said cylinder structure to feed the plastic material into and through said flow passage and female die, a male die extending from said flow passage into and through the female die in coaxial and concentrically spaced relation to the latter, a spider assembly disposed across said flow passage, said assembly comprising a ring countersunk in the walls of the cylinder structure with its opening in register with said flow passage, a central hub within and spaced from said ring in concentric relation thereto and supported therefrom by intermediate radial ribs extending across the flow passage, said male die being connected with said hub so as to be supported thereby, a baffle section connected between said hub and male die to project radially across the flow passage with its periphery concentric to and somewhat spaced from the walls of said passage, and said baffle section having a plurality of through orifices communicating with said flow passage, said orifices lying in end to end planes parallel to the axis of the flow passage but being diagonally inclined from their intake ends to their outlet ends across the axis of the flow passage, whereby a proportion of extruding material issuing past the spider assembly toward the female and male dies is divided into a plurality of material swirling jets adapted to mingle and coalesce with the stream of material delivered to said female and male dies, and thereby to form a homogeneous and seamless flow of material through said dies.

2. The invention as defined in claim 1, wherein the baffle section is provided with demountable screw-threaded connections respectively to the spider assembly hub and to the male die.

3. The invention as defined in claim 1, wherein the baffle section is shaped to provide inner and outer faces converging toward the periphery thereof.

4. The invention as defined in claim 1, wherein the orifices of the baffle section are circumferentially evenly spaced and radially outwardly offset relative to the spider assembly hub and the male die.

5. The invention as defined in claim 1, wherein the orifices of the baffle section are inclined transverse to the axis of the flow passage at a selected angle ranging from 5 to 50 degrees.

6. The invention as defined in claim 1, wherein the orifices of the baffle section are inclined transverse to the axis of the flow passage at a selected angle ranging from 25 to 35 degrees.

References Cited in the file of this patent

UNITED STATES PATENTS

| 1,768,671 | Devine | July 1, 1930 |
| 1,876,256 | Maynard | Sept. 6, 1932 |
| 2,469,999 | Stober | May 10, 1949 |
| 3,069,724 | Schiedrum | Dec. 25, 1962 |

FOREIGN PATENTS

| 1,223,527 | France | Feb. 1, 1960 |